Oct. 31, 1939.  G. A. JOHNSON  2,178,258

REAR-VIEW MIRROR MOUNTING

Filed May 2, 1938

INVENTOR.
Glen A. Johnson

Patented Oct. 31, 1939

2,178,258

UNITED STATES PATENT OFFICE 2,178,258

REAR-VIEW MIRROR MOUNTING

Glen A. Johnson, Connersville, Ind., assignor to Stant Manufacturing Company, Connersville, Ind.

Application May 2, 1938, Serial No. 205,473

2 Claims. (Cl. 248—226)

My invention relates to rear-view mirrors for motor vehicles and has for its object the provision of a new and novel arrangement of elements for clamping the mirror arm rigidly to the edge of a motor vehicle door and particularly the peripheral portion of the door which is formed into a flange or lip.

It is another object of my invention to provide a mirror having a powerful clamping means which can be quickly and rigidly applied to the door flange, which does not become loosened by jolting and is substantially theft proof.

Another object of my invention is the arrangement of the entire clamping means on the extreme end of the mirror arm in such a manner as to conceal the actual clamping mechanism within a hollow bracket.

A further object is the provision of a device of the class described in which the clamping means also comprises the means for permitting adjustment of the mirror arm and provides sufficient friction to retain the arm in any adjusted position.

The preferred means by which I have accomplished my several objects are illustrated in the accompanying drawing and are hereinafter specifically described.

Figure 1:
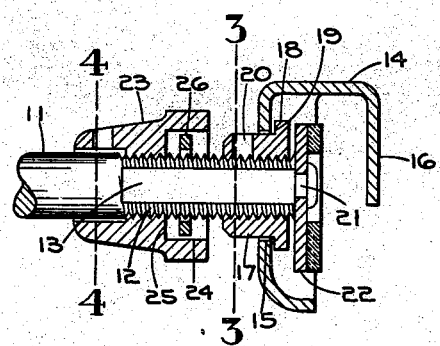
Fig. 1 is a vertical section through the clamp mechanism shown in unlocked position.

Referring to the drawing in detail, 9 is a mirror encased in a metal shell into which is secured at 10 an arm 11. The arm 11 is threaded back a short distance at 12 and the threaded portion is machined flat on each side at 13 and 13'. The substantially U-shaped bracket 14 is provided with a hole 15 and a turned down lip 16 the lower edge of which is preferably in line with the axis of hole 15. Through the hole 15 is loosely fitted a clamping nut 17 which is threaded on the inside to fit the threaded portion 12 of the arm 11. The clamping nut 17 is substantially tubular in shape; the inside is threaded to fit threads 12 and the outside diameter extends rotatably through hole 15. The nut is provided at one end with an annular shoulder 18 of larger diameter than the hole 15. This provides a friction surface or seat 19 against the inside surface of the bracket. At a point on the tubular portion of the clamping nut beyond the outside surface of the bracket 14 a hole 20 is provided for a spanner wrench.

The extreme end of the arm 11 is reduced in diameter to form a shoulder 21 for holding the clamping plate 22 which is riveted thereon loosely to permit rotation of the arm.

The clamping plate 22 is faced with a material such as fibre or rubber to prevent marring or slipping on the painted surface of the automobile door flange.

Also threaded on to the shaft 11 is the locking nut 23 which is provided with a counterbore 24. This counterbore is of a suitable diameter to clear the outside surface of the clamping nut 17. The bottom 25 of the counterbore 24 is of such depth that when it is in locking position against the clamping nut and washer the face of the lock nut does not contact the surface of the bracket. The washer 26 is provided with a hole to fit the milled portions 13 and 13' of the arm 11. This prevents rotation of the washer relative to the arm but permits longitudinal movement thereof. Thus, when the lock nut 23 is tightened against clamping nut 17 and lock washer 26 the rotation of the lock nut is not transmitted to the clamping nut thus creating a holding means for the clamping nut during tightening of the lock nut.

Figure 2:
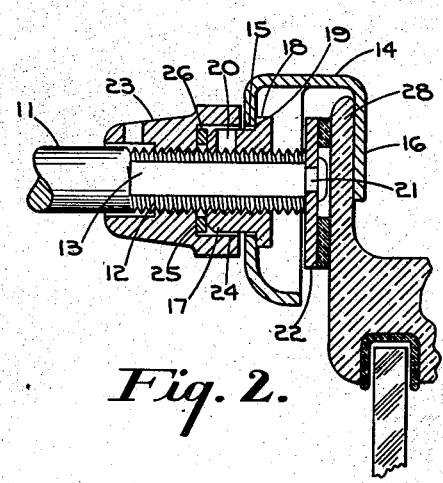
Fig. 2 is a vertical section through the clamp mechanism shown in clamped position on the door flange.
Figure 3:
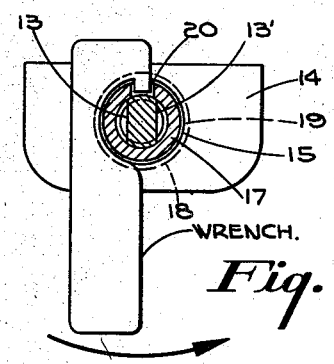
Fig. 3 is a section taken at line 3—3 on Fig. 1 and also showing the special wrench in use on the clamping nut.
Figure 4:
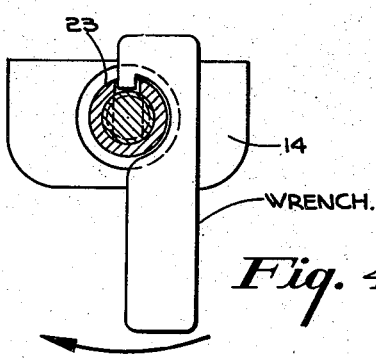
Fig. 4 is a section taken on line 4—4 of Fig. 1 and also showing the method of tightening the lock nut.
Figure 6:
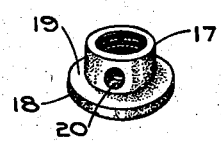
Fig. 6 is a perspective view of the clamping nut.
Figure 8:
Fig. 8 is a perspective view of the lock washer.
Figure 7:
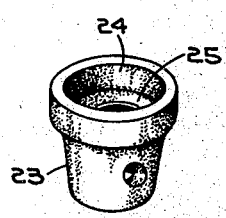
Fig. 7 is a perspective view of the lock nut.
Figure 5:
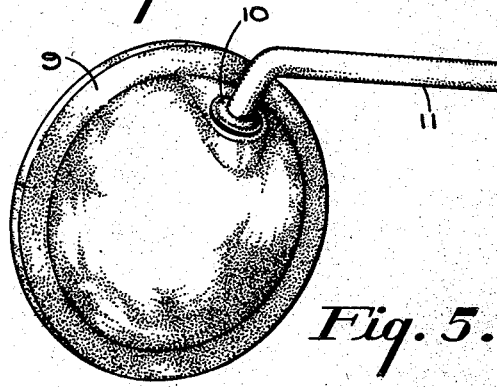
Fig. 5 shows the complete device attached to the automobile door flange.

To attach the bracket to an automobile door the lip 16 is placed behind the door flange 28 as illustrated in Fig. 2. The spanner wrench is then inserted in the hole 20 of nut 17 and rotated in an anti-clockwise direction as shown in Fig. 3 until the bracket is clamped tightly on the door as shown in Fig. 2. The nut 23 is then tightened by turning in a clockwise direction as shown in Fig. 4.

When the mechanism is in locked position as shown in Fig. 2, the arm 11 may be rotated on its axis for adjustment of the mirror for proper vision. The nuts 23 and 17 are locked securely together upon the washer 26 and thus upon the threads 12. When the arm is rotated the shoulder 19 rotates against the bracket 14 and rivet 21 rotates within the clamping plate 22. The amount of friction is determined by the stiffness of the bracket 14 and the degree to which the nut 17 is tightened.

It will readily be seen that whereas I have shown and described a device having right hand threads on the shaft, it would operate just as efficiently should left hand threads be used. This simply means that the direction of rotation of the two nuts would be reversed.

While the foregoing description specifically sets forth the invention, it is to be understood that various changes in the shape, size and materials may be resorted to without departing from the spirit and scope of the invention as claimed hereinafter.

Having thus described my invention, what is claimed as new is:

1. In combination with a substantially U-shaped bracket having a hole in one leg thereof, a tubular flanged clamping nut carried loosely in said hole with the flange thereon abutting the inside surface of the bracket adjacent said hole, a threaded rod extending through said clamping nut in threaded engagement therewith, a clamping plate carried on the end of the rod between the legs of said bracket, a lock nut also threadedly carried by said rod and adapted to engage said clamping nut to prevent rotation thereof relative to said rod, said lock nut being spaced away from said bracket when in locked position.

2. In combination with a substantially U-shaped bracket having a hole in one leg thereof, a tubular clamping nut carried loosely in said hole and having an annular shoulder thereon abutting the inside surface of the bracket adjacent said hole, a rod extending through said clamping nut in threaded engagement therewith, a clamping plate carried swivelly on the end of said rod between the legs of said bracket, said clamping nut having a wrench receiving portion extending beyond the outside surface of said bracket adjacent said hole, a lock nut carried on said rod in threaded engagement therewith and having a hollow portion thereon adapted to telescope and substantially conceal said wrench receiving portion of said clamping nut, said lock nut adapted to lock against the end of said clamping nut and to be spaced from the adjacent surface of said bracket when in locked position.

GLEN A. JOHNSON.